United States Patent [19]

Finkle

[11] 4,420,989
[45] Dec. 20, 1983

[54] ADJUSTABLE SHOCK ABSORBING HANDLEBAR STRUCTURE

[76] Inventor: Louis J. Finkle, 3300 E. 59th St., Long Beach, Calif. 90805

[21] Appl. No.: 280,281

[22] Filed: Jul. 6, 1981

[51] Int. Cl.³ ............................................. B62K 21/14
[52] U.S. Cl. .................................. 74/551.2; 74/551.5; 188/319; 188/312
[58] Field of Search ................... 74/551.2, 470, 551.4, 74/551.5; 280/276, 289, 282; 188/319, 312, 278, 277, 299; 267/8 R, 136

[56] References Cited

U.S. PATENT DOCUMENTS

| 1,424,695 | 8/1922 | Violet | 74/551.2 |
| 1,719,007 | 7/1929 | Gayda | 74/551.2 |
| 3,181,270 | 5/1965 | Trevena | 74/470 |

FOREIGN PATENT DOCUMENTS 426390  10/1947  Italy ................................ 74/551.2

*Primary Examiner*—Leslie A. Braun
*Assistant Examiner*—Anthony W. Raskob, Jr.
*Attorney, Agent, or Firm*—William C. Babcock

[57] ABSTRACT

A handlebar structure particularly adapted for use on motorcycles employed in racing over rough and uneven terrain. The grips and the angulation of first and second oppositely disposed across members structures are manually adjustable to suit the riding characteristics of a particular rider. A combination of resilient pads and a fluid containing shock absorber cooperate to minimize the shock transmitted to the arms of a rider in traveling over a rough and uneven course. In an alternate form of the invention resilient cross members serve to minimize the shock transmitted to a rider as his motorcycle traverses an uneven course.

5 Claims, 7 Drawing Figures

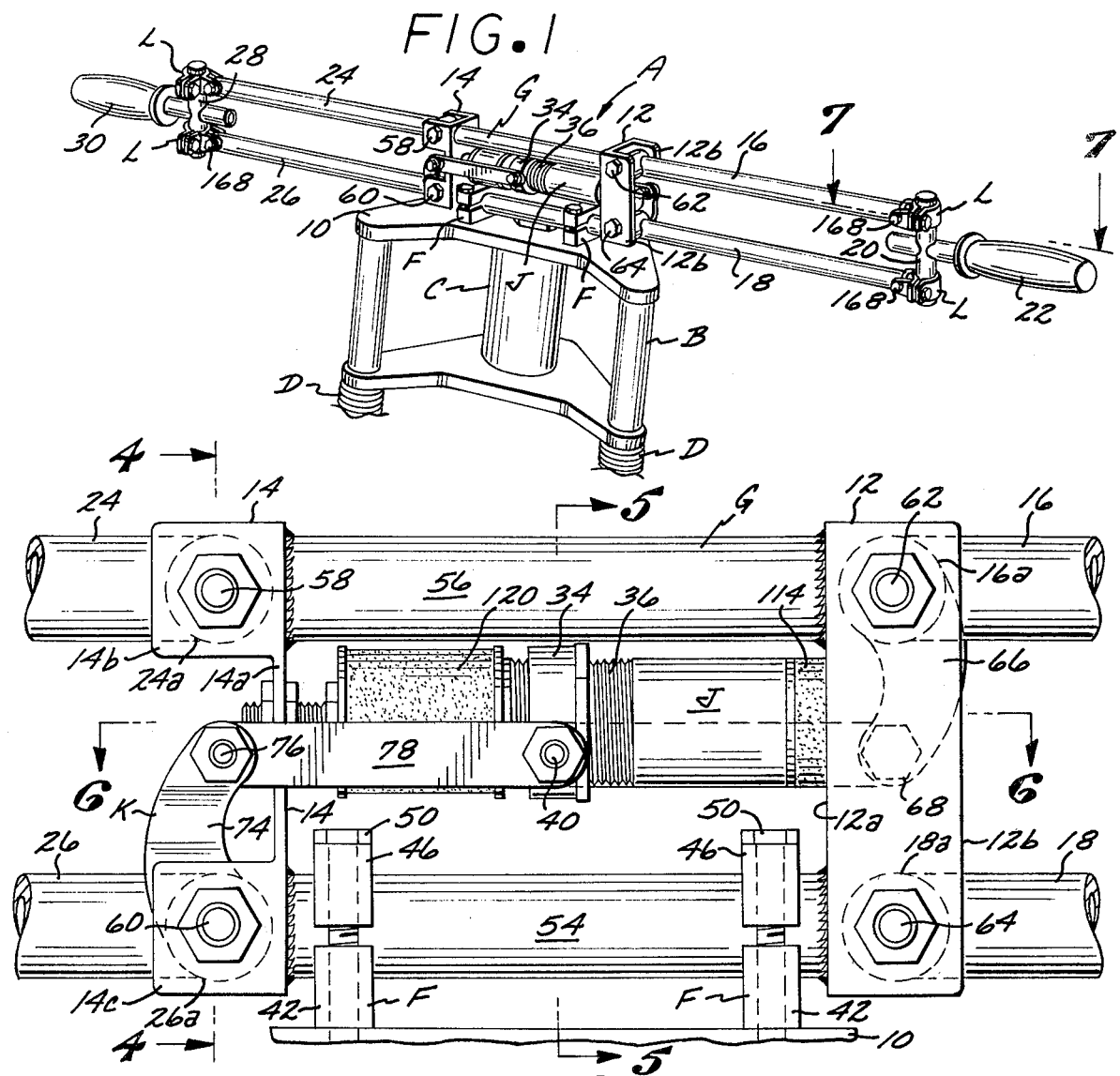
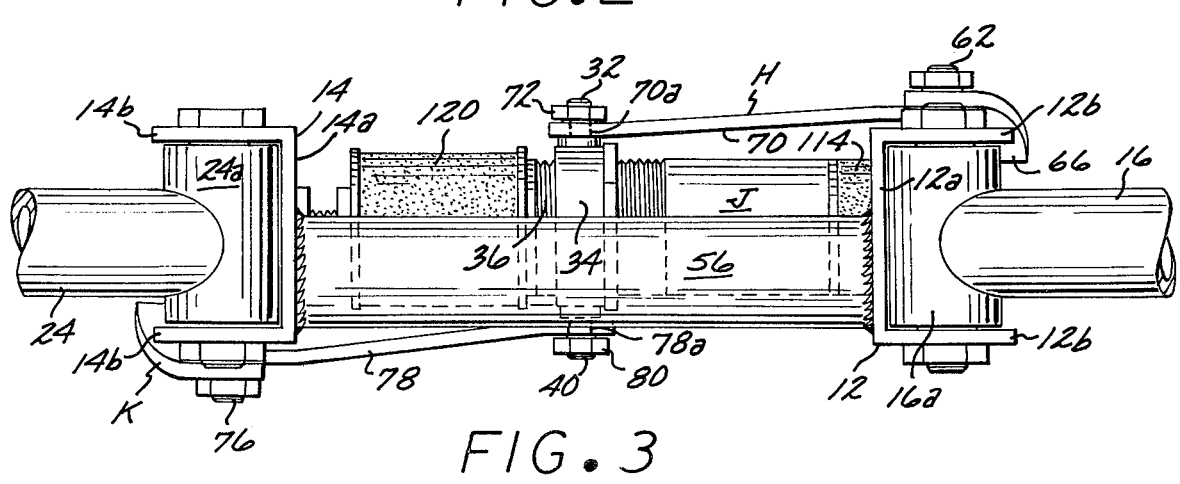

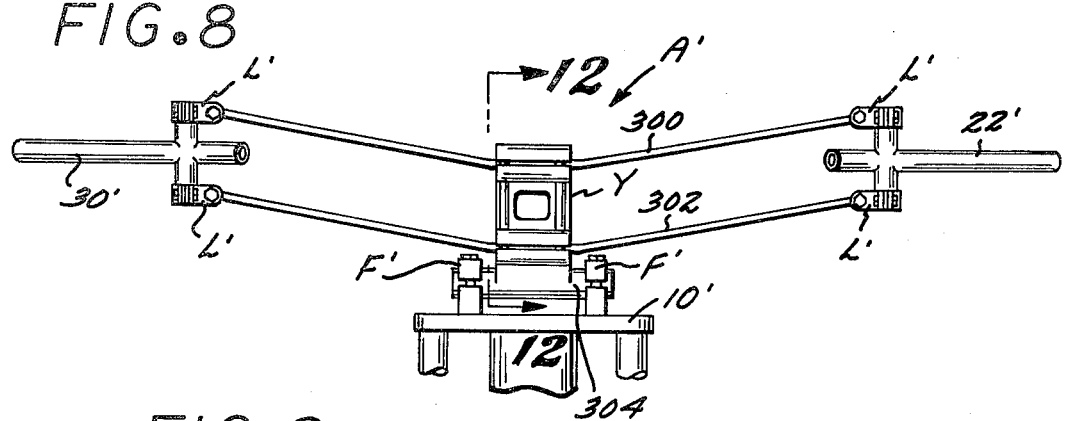
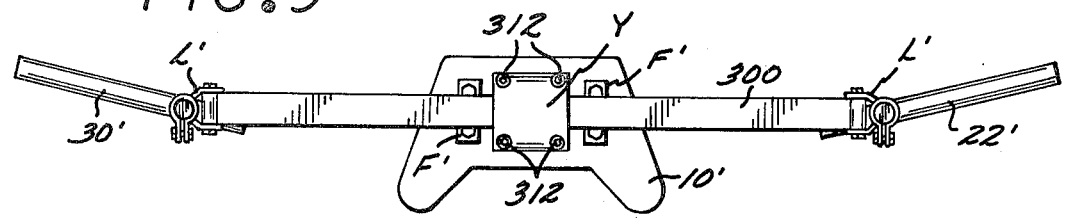
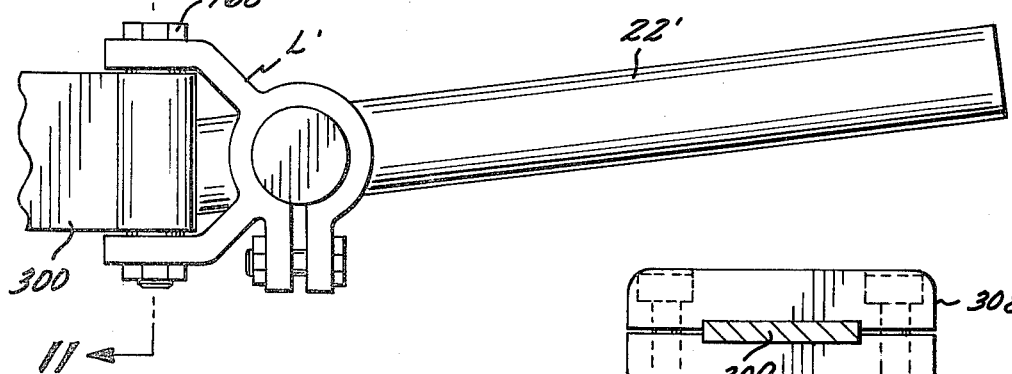
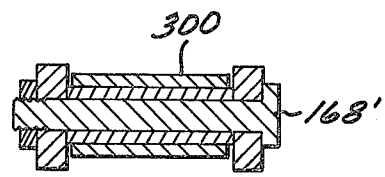
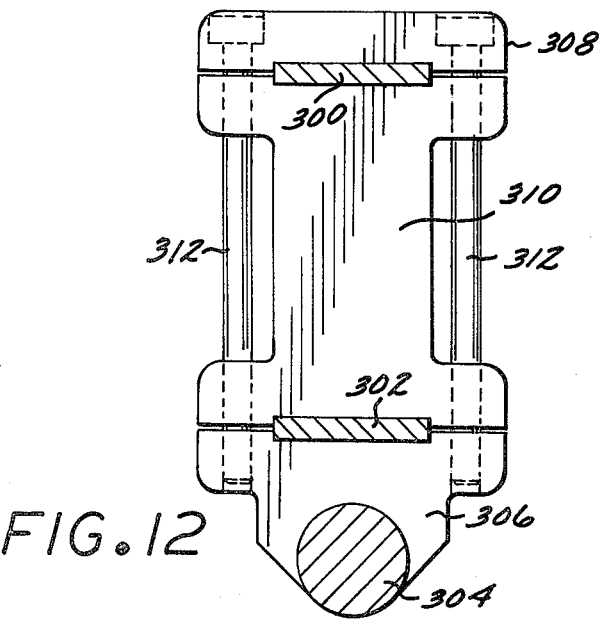

ADJUSTABLE SHOCK ABSORBING HANDLEBAR STRUCTURE

BACKGROUND OF THE INVENTION

1. Field of the Invention

Adjustable Shock Absorbing Handlebar Structure

2. Description of the Prior Art

In the past, it has been common practice to have the forked forward structure of a motorcycle that rotatably supports the front wheel of the vehicle to be glued by a pair of handlebars of rigid structure that terminate on the ends thereof in grips that are engaged by the rider. As a motorcycle of this structure travels over rough and uneven terrain such as is encountered in racing, the shock of the forward wheel of the vehicle as it moves upwardly and downwardly in traversing the uneven terrain is transmitted through the handlebar of the motorcycle to the arms of the rider, with this shock being so severe that at times in racing the rider must give up as his arms are no longer able to withstand the constant strain imposed thereon by vibrations and shocks imparted to them through the handlebar structure.

A major object of the present invention is to provide a shock absorbing handlebar structure that may be removably secured to an existing motorcycle or embodied as an integral part of a new vehicle, with the handlebar structure of the present invention minimizing the shock transmitted from the front wheel of the vehicle to the hands of the rider as the vehicle traverses uneven terrain such as is encountered in racing.

Another object of the invention is to supply a handlebar structure in which the oppositely disposed transverse cross member are angularly adjustable to his particular riding posture, and the grips on the ends of the cross member structures also being adjustable angularly to conform to his particular style of riding.

A still further object of the invention is to supply a handlebar structure in which the shock transmitted upwardly through the forked forward wheel supporting portion of the vehicle is minimized due to the cooperation of a shock absorber and oppositely disposed resilient pads operatively associated therewith.

These and other objects and advantages of the invention will become apparent from the following description of a preferred form thereof.

SUMMARY OF THE INVENTION

The handlebar assembly of the present invention is secured to a conventional assembly that is pivotally supported on the upper forward portions of the frame of a motorcycle, which forward portion has a pair of legs extending downwardly therefrom that supports the forward wheel of the vehicle. The assembly includes a pair of first clamps that project upwardly from on upper rigid plate that is utilized in pivoting the forked forward wheel support, and the upper plate also supporting a pair of second clamps that removably support a rigid rectangular frame therefrom. The frame has laterally spaced first and second end pieces. The first end piece pivotally supports first upper and lower cross members that are pivotally and adjustably connected on their outer ends by a first generally vertical support that has a first grip projecting outwardly therefrom.

Second upper and lower cross members are pivotally connected to the second end piece, with the other ends of the second pair of cross members pivotally and adjustably connected to a second vertical support that has a second grip projecting outwardly therefrom in a direction opposite that from the first grip. First link assembly is connected to the upper first cross member and by a first stud bolt to an internally threaded ring that engages external threads on a shock absorber assembly.

A second link assembly extends between the second lower cross member and a second bolt that projects upwardly from the ring. The ring is longitudinally adjustable on the shock absorber assembly. First and second resilient pads are in abutting contact with opposite ends of the shock absorber. The shock absorber and resilient pads are supported between the first and second end pieces of the rectangular frame previously described.

As upward and downward shocks are imparted to the handlebar structure of the present invention from the front wheel of the vehicle as it traverses on uneven terrain, the first and second resilient pads that form a part of the invention serve to cushion the shock, due to being temporarily compressed, and the shock absorber minimizing a further shock to the rider as the resilient pads tend to return to their normal non-compressed condition. These and other advantages of the invention will become apparent from the following detailed description of the structure thereof.

BRIEF DESCRIPTION OF THE DRAWINGS

FIG. 1 is a perspective view of the shock absorbing handlebar structure;

FIG. 2 is an enlarged fragmentary front elevational view of the center portion of the invention and illustrating the first and second resilient pads, the shock absorber, and the linkage mechanism connecting the oppositely disposed cross-bar structure of the handlebars thereto;

FIG. 3 is a top plan view of the portion of the invention shown in FIG. 2;

FIG. 8 is a front elevational view of an alternate form of the handlebar structure adapted for minimizing shock transmitted to a rider in traversing rough terrain;

FIG. 9 is a top plan view of the alternate form of the invention;

FIG. 10 is a fragmentary enlarged side elevational view of a portion of the alternate form of the invention illustrating the adjustability of one of the grips that form a part thereof;

FIG. 11 is a fragmentary transverse cross sectional view of the alternate form of the invention taken on the line 11—11 of FIG. 10; and FIG. 12 is a transverse cross sectional view of the alternate form of the handlebar structure taken on the line 12—12 of FIG. 8.

DESCRIPTION OF THE PREFERRED EMBODIMENT

Figure 4:
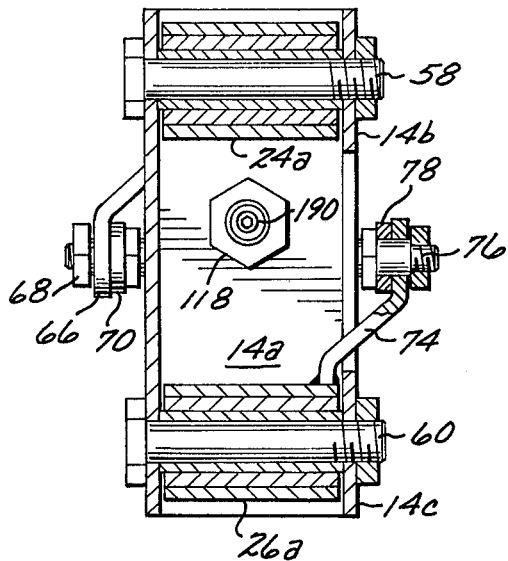
FIG. 4 is a transverse cross sectional view of the invention taken on the line 4—4 of FIG. 2.

The handlebar assembly A of the present invention is secured to a conventional assembly B that is pivotally supported on a conventional upward portion C of a frame C-1 of a motorcycle (not shown), which portion C has a pair of legs D extending downwardly therefrom that rotatably supports the forward wheel of the motorcycle (not shown).

Assemby B includes an upper rigid plate 10 that has a pair of spaced clamps F projecting upwardly therefrom that removably support a rigid frame G that has laterally spaced first and second end pieces 12 and 14.

The first end piece pivotally supports first upper and lower cross members 16 and 18 that are pivotally and adjustably connected on their outer ends by a first generally vertical support 20 that has a first grip 22 projecting outwardly therefrom.

Second upper and lower cross members 24 and 26 are pivotally connected to the second end piece 14, with the outer ends of the second pair of cross members pivotally and adjustably connected to a second vertical support 28 that has a second grip 30 projecting outwardly therefrom.

A first link assembly H is connected to the first upper cross member 16 and by a first stud bolt 32 is pivotally connected to an internally threaded ring 34 as shown in FIG. 3 that engages external threads 36 on a shock absorber J. A second link assembly K extends between the second lower cross member 26 and a second bolt 40 that projects outwardly from ring 34.

Figure 5:
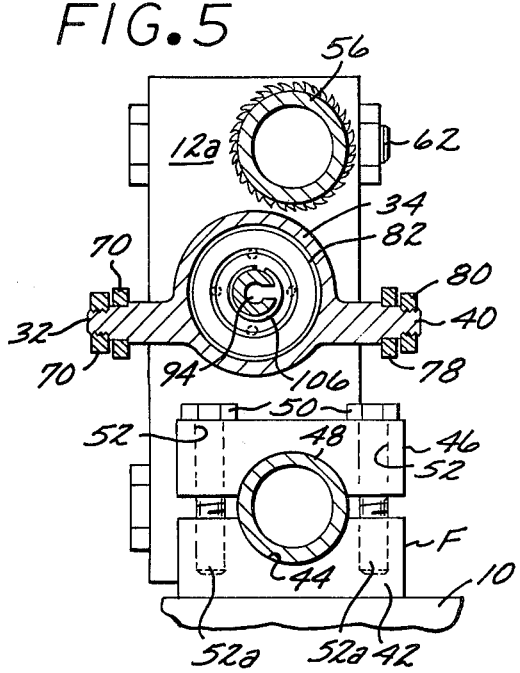
FIG. 5 is a second transverse cross sectional view of the invention taken on the line 5—5 of FIG. 2.

In detail it will be seen in FIGS. 2 and 5 that each of the clamps F includes a rigid lower block 42 that has a transverse semi-circular groove 44 extending thereacross, and an upper block 46 that has a transverse semi-circular groove therein. A pair of screws 50 extend downwardly through bores 52 formed in upper block 46 as shown in FIG. 5 to threadedly engage tapped recesses 52a formed in the lower block 42.

The end pieces 12 and 14 of frame G as shown in FIG. 3 are formed from rigid channels that have adjacent disposed vertical webs 12a and 14a. A first pair of flanges 12b extend from the edges of first web 12a as may be seen in FIGS. 2 and 3. Upper and lower pairs of flanges 14b and 14c extend from second web 14a.

Webs 12a and 14a have a lower rigid tube 54 secured thereto as shown in FIG. 2 that forms a part of frame G and is removably gripped by the pair of clamps F when the screws 50 are tightened. Frame G is completed by an upper heavy tube 56 that extends between first and second flanges 12a and 14a as shown in FIGS. 1 and 2.

The upper and lower second cross members 24 and 26 as may best be seen in FIGS. 2, 3 and 4 have their inner ends rigidly secured to upper and lower transverse tubular members 24a and 26a that are rotatably supported on transverse bolts 58 and 60 that extend between the upper and lower pairs of flanges 14b and 14c. Likewise the upper and lower first cross members 16 and 18 have their inner ends rigidly secured to transverse tubular members 16a and 18a that are pivotally supported on bolts 62 and 64 that extend between the pair of flanges 12b.

The first link assembly H includes a first rigid member 66 that depends from tubular member 16a and is rigidly secured thereto. The lower end portion of member 66 as viewed in FIG. 2 is pivotally connected by a screw and nut assembly 68 to a first end portion of an elongate rigid first link 70, that has a second end portion in which a transverse bore 70a is formed that pivotally engages first bolt 32. First bolt 32 has threads thereon that are engaged by a nut 72 to maintain first link 70 in engagement with first bolt 32.

The second link assembly K as best seen in FIGS. 2 and 3 is similar in structure to the first link assembly H. The second link assembly K as seen in FIG. 4 includes a second rigid member 74 that is welded or otherwise rigidly secured to tubular member 26a and on its upper end portion as viewed in FIG. 2 is by a screw and nut assembly 76 pivotally connected to a first end portion of a rigid second link 78, which second link includes a second end portion in which a transverse bore 78a is formed that pivotally engages the second bolt 40. Bolt 40 has threads thereon that are engaged by a nut 80 to removably maintain second link 78 in pivotal engagement with the second bolt 40.

Shock absorber J as may best be seen includes a cylindrical shell 82 that has internal threads 82a defined on a first end portion thereof that engage external threads formed on a first end piece 84. First end piece 84 has a centered transverse bore 84a therein from which a groove 84b extends outwardly. Groove 84b supports a resilient sealing ring 84c.

Figure 6:
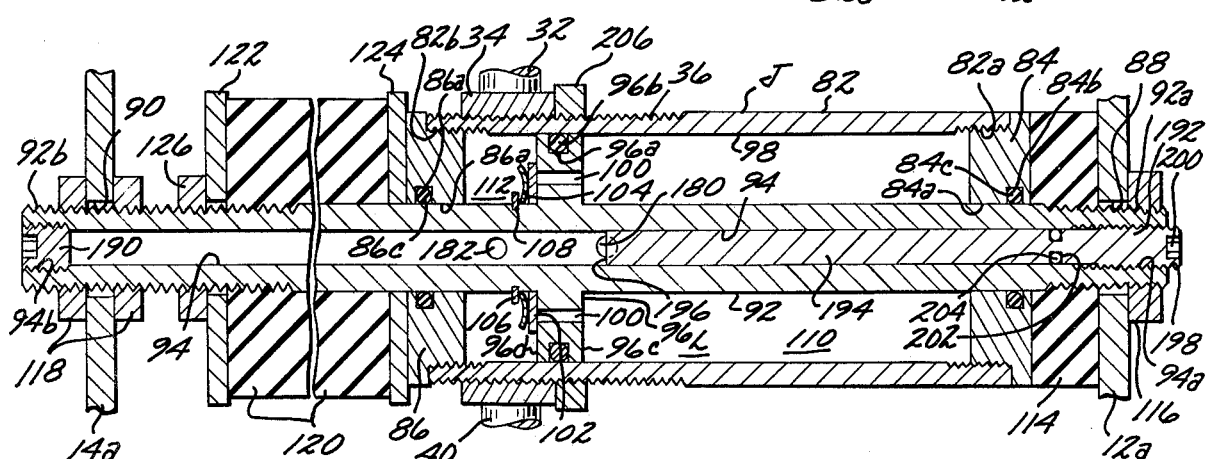
FIG. 6 is a longitudinal cross sectional view of the center portion of the invention taken on the line 6—6 of FIG. 2.

Second internal threads are formed on a second end portion of shell 82. A second end piece 86 is provided as shown in FIG. 6 that has external threads thereon that engage second threads 82b. Second end piece 86 has a centered transverse bore 86a extending outwardly therefrom in which a second sealing ring 86c is disposed.

First and second axially aligned transverse bores 88 and 90 are formed in the first and second vertical webs 12a and 14a as may be seen in FIG. 6. An elongate piston rod 92 is provided that has a bore 94 extending longitudinally therethrough, with the piston rod having first and second external end portions on which first and second threads 92a and 92b are defined thereon. The bore 94 has first and second end portions in which first and second internal threads 94a and 94b are defined as shown in FIG. 6.

A piston 96 extends outwardly from piston rod 92 and is disposed within shell 82 as shown in FIG. 6. Piston 96 has a circumferential groove 96a in the outer peripheral portion thereof in which a resilient sealing ring 96b is disposed that slidably and sealingly engages the interior surface 98 of cylindrical shell 82. Piston 96 has first and second side surfaces 96c and 96d.

A number of circumferentially spaced, transverse, apertures 100 extend through piston 96. A ring shaped valve plate 102 is mounted on piston rod 92 to the left of piston 96 as viewed in FIG. 6 and is urged into sealing contact with second piston side surface 96d by a circular resilient ring 104 of arcuate transverse cross section. Resilient ring 104 has the inner periphery thereof in abutting contact with a snap ring 106 that engages a groove 108 in the piston rod 92. The piston 96 subdivides the interior of shell 82 into first and second compartments 110 and 112 of variable volume in which a hydraulic liquid L is contained. Valve plate 102 prevents the flow of hydraulic liquid L from second compartment 112 to first compartment 110.

A first ring shaped resilient pad 114 is mounted on piston rod 92 between first end piece 84 and first web 12a. A first nut 116 engages threads 92a. A pair of second nuts 118 engage the second threads 92b on opposite sides of the second web 14a as shown in FIG. 6. A second ring shaped resilient pad 120 is mounted on the piston rod 92 between first and second ring shaped pressure plates 122 and 124. Second pressure plate 124 abuts against second end piece 86. A third nut 126 engages threads 92b and bears against first pressure plate 122.

Figure 7:
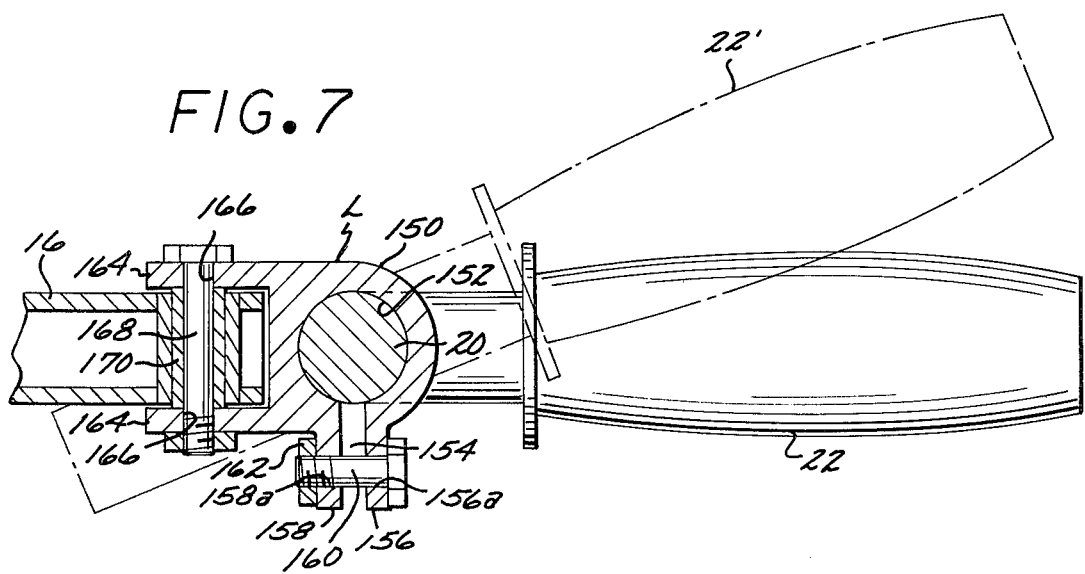
FIG. 7 is a fragmentary cross sectional view of an end portion of the invention illustrating one of the grips, and taken on the line 7—7 of FIG. 1.

The first and second vertical supports 20 and 28 have the upper and lower portions thereof adjustably engaged by identical clamp assemblies L, one of which is shown in detail in FIG. 7. Each clamp assembly L includes a slightly resilient body 150 that has a vertical bore 152 therein that communicates with a transverse slot 154 defined between first and second outwardly extending legs 156 and 158. Bore 152 snuggly engages an end portion of one of the supports 20 or 28. Legs 156 and 158 have transversely aligned bores 156a and 158a therein through which a screw 160 extends that is engaged by a nut 162.

Each body 150 has a pair of legs 164 extending therefrom at approximately 90 degrees from the legs 156 and 158. The pair of legs 164 have aligned transverse bores 166 therein through which a bolt 168 extends. The bolt 168 also extends through a transverse sleeve 170 found in the outer end portions of one of the cross members 16, 18, 24 and 26.

By loosening the nuts 162 the first and second supports 20 and 28 can be pivoted to dispose the grips 22 and 30 at desired angles relative to the first and second pair of cross bars 16, 18, 24 and 26 for a particular rider. A second position for the grip 22 is shown in phantom line in FIG. 7 and identified by the numeral 22'.

The first compartment 110 is in communication with a first port 180 on the right hand side of piston 96 as viewed in FIG. 6, with the first port also in communication with bore 94 that communicates with a second port 182 in the piston rod to the left of the piston as shown in FIG. 6. Port 182 is in communication with second compartment 112.

The left hand end of bore 94 as viewed in FIG. 6 has threads 94b formed therein that are removably engaged by an externally threaded plug 190. The first threads 94a are engaged by a threaded end portion 192 of a rod 194 that has a first end 196. End portion 192 has an outer face 198 in which a non-circular cavity 200 is defined to permit rotation of the rod 194 by a hand tool (not shown). Rod 194 is disposed in bore 94. Rod 194 has a circumferential groove 202 therein in which a resilient sealing ring 204 is disposed that sealingly engages the interior of bore 94. An internally threaded locking ring 206 engages threads 36 as shown in FIG. 6 and serves to hold ring 34 at a desired longitudinally adjusted position on hydraulic cylinder shell 82.

The use and operation of the invention A is as follows. By rotating the rod 194, the rod may be moved longitudinally to partially reduce the effective cross section of the first port 180 to reduce the rate of flow of hydraulic liquid L between the first compartment 110 and second compartment 112. Likewise by rotating the nut 126 in an appropriate direction, the first pressure 122 as viewed in FIG. 6 is moved to the right to increase compression on second resilient pad 120 and through hydraulic cylinder J to second compression pad 114 to increase the compression on the latter.

When the ring 34 is moved longitudinally relative to the shell 82 the first and second link assemblies H and K are concurrently pivoted to pivot the first upper and lower cross bars 16 and 18 and second upper and lower cross bars 24 and 26 upwardly and downwardly to a desired angle relative to the upper plate 10. As such pivotal movement takes place the first and second grip supports 20 and 28 move upwardly and downwardly in a vertical direction due to the clamp assemblies L affixed thereto being pivotally connected to the outer end portions of first upper and lower cross bars 16 and 18 and second upper and lower cross bars 24 and 26. The first and second grips 22 and 30 as previously described are pivotally adjustable to desired angles relative to the first and second sets of upper and lower cross bars 16, 18, 24 and 26.

When the forward wheel of the motorcycle on which the handlebar assembly A is mounted encounters a rough portion of terrain that causes the first upper and lower cross bars 16 and 18 and second upper and lower cross bars 24 and 26 to pivot downwardly and inwardly towards one another the first link assembly H tends to push the hydraulic shell 82 to the left relative to the piston 96 and the second link assembly tends to pull the shell in the same direction, with the shock being transferred to the second resilient pad 120 to compress the same. Concurrently, hydraulic liquid flows from the first compartment 110 to the second compartment 112 through ports 180, bore 94 and port 182. Hydraulic liquid L in first compartment 110 is subjected to sufficient pressure to flow through apertures 100 by unseating ring 102. Hydraulic liquid L has now entered second compartment 112 that has expanded in volume and in so doing has absorbed a part of the shock.

After the shock is over, the second resilient pad 120 tends to expand to the right, and in so doing contracting the size of second compartment 112, due to the shell 82 moving to the right relative to piston 96. The spring loaded valve plate 102 will not allow flow of hydraulic fluid through apertures 100 into first compartment 110. A portion of the shock as second resilient pad tends to expand longitudinally and pivot first upper and lower cross bars 16 and 18 and second upper and lower cross bars upwardly relative to plate 10 is absorbed by hydraulic liquid flowing through port 182, bore 94 and restricted port 180 into first compartment 110 that is increasing in volume. As second resilient pad 120 expands to the right, in moves shell 82 to the right, and a portion of the shock being absorbed by first resilient pad 114.

An alternate form A' of the motorcycle handlebar invention is shown in FIGS. 8 to 12. Elements common to the first form A in alternate form A' are identified by the same numerals and letters previously used but with primes added thereto.

Upper and lower cross bars 300 and 302 extend outwardly in opposite directions from a body Y, with the cross bars on their outer ends supporting assemblies L' and grips 22' and 30' as in the first form A of the invention. The upper and lower cross bars are steel strap that absorb up and down shock by flexing but are of sufficient width as to not deform appreciably in a transverse direction.

The plate 10' has two clamps F' mounted thereon that grip a tubular member 304 that is a part of a lower 306 of body Y. An upper portion 308 and intermediate portion 310 are removably held together by a pair of bolts 312 and in conjunction with lower portion 306 removably grip central portions of the upper and lower cross bars 300 and 302 as shown in FIGS. 8 and 12.

From the above description it will be seen that the alternate form A' of the handlebar structure permits the motorcycle (not shown) on which it is mounted to be steered in a conventional manner, but with shock transferred to the vehicle as it traverses rough terrain being absorbed to a major extent by the resilient cross bars 300 and 302 flexing upwardly and downwardly relative to the body Y that grips the center portions thereof.

The use and operation of the form of the invention A and A' have been explained and described previously in detail and need not be repeated.

What is claimed is:

1. In combination with a motorcycle that has a frame that pivotally supports a forked forward front wheel supporting structure having an upper extremity, an adjustable shock absorbing handlebar structure that includes:
   a. a rigid plate secured to said upper extremity;
   b. a rigid frame secured to said plate and extending upwardly therefrom, said frame including first and second end pieces and an upper cross piece;
   c. first upper and lower cross bars pivotally connected to said first end piece and second upper and lower cross bars pivotally connected to said second end piece, said cross bars having outer ends, said first and second cross bars extending from said frame in opposite directions;
   d. first and second supports pivotally connected to said outer ends of said first upper and lower cross bars and said outer ends of said second upper and lower cross bars;
   e. first and second grips extending outwardly in opposite directions from said first and second supports;
   f. a rod that extends between said first and second end pieces;
   g. first and second tubular resilient pads mounted in longitudinally spaced relationship on said rod, each of said pads having first and second end surfaces, and said first end surfaces adjacently disposed;
   h. rigid first means slidably mounted on said rod and in abutting contact with said first end surfaces;
   i. first and second linkage means pivotally connected to said rigid means and to said first upper cross bar and to said lower cross bar, and said first and second resilient pads, said rigid means, and said first and second linkage means cooperating to maintain said first upper and lower cross bars and second upper and lower cross bars at a first position relative to said frame; and
   j. second and third means mounted on said rod and in abutting contact with said second end surfaces, with at least said second means being in abutting contact with said second end surface of said second resilient pad, with said second means when moved longitudinally relative to said rod varying the degree of compression on said first and second resilient pads and the degree of shock that will be transmitted from said motorcycle to said grips.

2. An adjustable handlebar structure as defined in claim 1 in which said second means is a hydraulic shock absorber assembly disposed between said first and second resilient pads and in abutting contact therewith, said assembly including an elongate rigid cylindrical shell to which said first and second linkage means are pivotally connected and that holds hydraulic liquid, and manually adjustable means to control the rate at which said hydraulic liquid may flow longitudinally in said shell, with said rate and the alternate compression of said second and first pads cooperating to minimize the shock transferred from said motorcycle to said first and second grips.

3. An adjustable shock absorbing handlebar structure as defined in claim 1 in which said first means is a hydraulic shock absorber that cooperates with said first and second resilient pads to minimize the degree of shock transferred from said motorcycle to said grips.

4. An adjustable shock absorbing handle bar structure as defined in claim 3 in which said shock absorber includes:
   k. a piston secured to said rod;
   l. A cylindrical rigid shell and first and second end pieces, said shell enveloping said piston, and said rod extending through sealed openings in said first and second end pieces, said piston subdividing the interior of said shell into first and second compartments, that may vary in volume, with said second means occupying a fixed position relative to said shell, and
   m. hydraulic fluid in said cylinder that moved through aperture means between said first and second compartments to absorb shock as said first and second linkage means move said shell relative to said piston.

5. An adjustable shock absorbing handle bar structure as defined in claim 4 in which said first and second linkage means are first and second arms that extend inwardly towards one another from said first upper cross bar and said second lower cross bar and said adjustable shock absorbing system in addition including:
   n. first and second transversely aligned protuberances that extend outwardly in opposite directions from said shell and are pivotally engaged by said first and second arms.

* * * * *